United States Patent [19]

Wyler et al.

[11] 4,279,168

[45] Jul. 21, 1981

[54] MASS RATE OF FLOW METER WITH ELECTROMAGNETIC INTERFERENCE COMPENSATION

[75] Inventors: John S. Wyler, Andover, Mass.; Richard A. Pfuntner, Alfred, Me.

[73] Assignee: General Electric Company, Wilmington, Mass.

[21] Appl. No.: 84,391

[22] Filed: Oct. 12, 1979 (Under 37 CFR 1.47)

[51] Int. Cl.$^3$ .............................................. G01F 1/80
[52] U.S. Cl. .................................................. 73/861.35
[58] Field of Search ........... 73/861.03, 861.35, 861.36; 324/174, 179; 310/155, 168; 336/84 R, 84 C

[56] References Cited

U.S. PATENT DOCUMENTS

| | | | |
|---|---|---|---|
| 3,393,388 | 7/1968 | Young | 73/861.35 |
| 3,722,279 | 3/1973 | Jablonski | 73/861.35 |
| 4,056,976 | 11/1977 | Hildebrand et al. | 73/861.35 |

*Primary Examiner*—Herbert Goldstein
*Attorney, Agent, or Firm*—I. David Blumenfeld

[57] ABSTRACT

A mass rate of flow meter including an unrestrained rotor and a restrained turbine and including a magnetic coupling for generating signals in a sensing coil when a predetermined point on the rotor passes a predetermined point on the turbine. A sensing means includes a sensing coil that is in a magnetic circuit with the magnetic means and a series bucking coil that is electrically in series with the sensing coil but magnetically isolated from the magnet means. A copper sheet formed as a shorted turn is disposed between the sensing and bucking coils. A mass rate of flow meter with this structure provides signals that are relatively insensitive to electromagnetic interference.

11 Claims, 2 Drawing Figures

MASS RATE OF FLOW METER WITH ELECTROMAGNETIC INTERFERENCE COMPENSATION

BACKGROUND OF THE INVENTION

This invention relates to mass rate of flow meters of the angular momentum type having a swirl generator for imparting swirl to the measured fluid stream and a torque balance reaction generator for removing the imparted swirl. More particularly, this invention relates to such a meter having an improved readout system for indicating the mass rate of flow.

This invention is particularly adapted for use in a mass rate of flow meter which utilizes a spring-restrained turbine as the torque balance reaction generator. One such mass rate of flow meter is depicted in U.S. Pat. No. 4,056,976 issued Nov. 8, 1977 and titled Mass Rate of Flow Meter, which patent is assigned to the same assignee as the present invention. This meter includes a housing that defines a fluid passage that extends along a longitudinal axis through the housing and that has an input port and an output port located on the axis. A swirl generator is located adjacent the input port to impart a substantially constant angular velocity to an entering fluid stream. As the fluid leaves the swirl generator, it passes through an axially displaced, unrestrained rotor that rotates about the axis. The angular velocity of the rotor accurately represents the angular velocity of the fluid stream as it leaves the rotor and passes through an axially spaced, spring-restrained turbine. The angular momentum of the fluid stream angularly displaces the turbine about the axis and against the bias of its restraining spring. Under steady state conditions, this deflection of the turbine is proportional to the mass rate of flow.

In a spring-restrained flow meter, the rotor carries two circumferentially and longitudinally displaced bar magnets. The first magnet is disposed on the input end of the rotor and is circumferentially poled. A first sensing coil assembly in a transverse plane through the first magnet is radially spaced from the magnet and isolated from the fluid flow. Each time the first magnet passes the first sensing coil, it induces a "start" pulse in the coil that indicates the passage of a predetermined point on the rotor past a predetermined point on the housing.

The second magnet is at the exit end of the rotor and diametrically opposed to the first magnet. An axially disposed, longitudinally extending bar of a highly permeable material, such as soft iron, mounts on the periphery of the turbine. The axial spacing between the rotor and the turbine interposes an axial air gap between the bar and the second magnet when they align. A second sensing coil assembly, that is isolated from the fuel flow, is coaxial with and longitudinally coextensive with the second magnet and the bar. Each time the second magnet passes the bar, the flux that the bar couples to the second sensing coil assembly changes and induces a voltage "stop" pulse in the second sensing coil. As described in the foregoing U.S. Pat. No. 4,056,976, timing circuits convert the start and stop pulses from the first and second sensing coil assemblies into an indication of the mass rate of flow through the meter.

Flowmeters of the type described in U.S. Pat. No. 4,056,976 are normally used in aircraft. In such applications, flowmeters are disposed in an environment that is characterized by high levels of electromagnetic interference. For example, on an aircraft alternators disposed on an engine and a number of conductors around the engine are sources of electromagnetic inerference. It is therefore necessary to construct a flowmeter which is insensitive to this electromagnetic interference. If the flowmeter is susceptible to electromagnetic interference, it can produce a signal even while there is is no flow and no motion of the rotor.

During operation, the rotor undergoes a wide range of rotational velocities. As the voltage induced in the coils is proportional to that velocity, the magnitude of the voltages that are produced in the sensing coils varies. In one particular application, for example, the voltage amplitudes of the pulses produced over a normally encountered range of fuel flows varies from about 30 millivolts to about 500 millivolts. With such variations it is necessary to minimize the signals that any electromagnetic interference might produce to a level below the 30 millivolt level, that is, that minimum voltage that would normally be generated during operation.

The first sensing coil has a longitudinal axis that extends radially with respect to the housing. The coil is a compact coil mounted on the housing of the flowmeter. It is relatively easy to shield from electromagnetic interference, as by the use of a highly permeable, magnetic cover that isolates the coil from the effects of electromagnetic interference. However, if that approach is attempted with the second sensing coil, which is wrapped completely around the housing, it does not produce acceptable results. It does not completely shield the coil from electromagnetic interference. The material that would be needed to provide acceptable results would add weight to the flowmeter which is not desirable in an aircraft application.

Another approach that might be used is that of compensating the electromagnetic interference by adding a coil that would produce a voltage of equal, but offsetting, value to that produced in the sensing coil in response to electromagnetic interference. Such coils are commonly known as a "bucking" coils. The bucking coil might be disposed either in parallel or in series with the sensing coil. However, it has been found that electromagnetic interference apparently induces a current in the housing itself which is composed of an electrically conducting material. This produces a phase shift between the voltages induced in the sensing coil and in the bucking coil. Thus, while the net effect is to reduce the signals that are induced by electromagnetic interference, the minimum levels that are achieved are still greater than acceptable levels.

SUMMARY

Therefore, it is an object of this invention to provide an improved mass rate of flow meter with a reliable readout system.

Another object of this invention is to provide an improved mass rate of flow meter with a reliable readout system that exhibits a reduced sensitivity to the effects of electromagnetic interference.

In accordance with this invention, the above and further objects are achieved in a mass rate of flow meter of the angular momentum type that utilizes a sensing coil that is coaxial with and axially coextensive with portions of a restrained turbine for generating signals when a predetermined point on a rotor passes a predetermined point on the turbine. A bucking coil means is mounted coaxially with the sensing coil means and electrically connected to it. In response to electromagnetic interference, the sensing coil and bucking coil produce offsetting interference voltages. Phase shifts in the interference voltages are compensated by positioning a shorted turn of a nonmagnetic, electrical conductor between the sensing and bucking coils. This structure enables signals induced by electromagnetic interference to be reduced to within acceptable levels.

This invention is pointed out with particularity in the appended claims. The above and further objects of this invention may be better understood by referring to the following description taken in conjunction with accompanying drawings.

DESCRIPTION OF AN ILLUSTRATIVE EMBODIMENT

Figure 1:
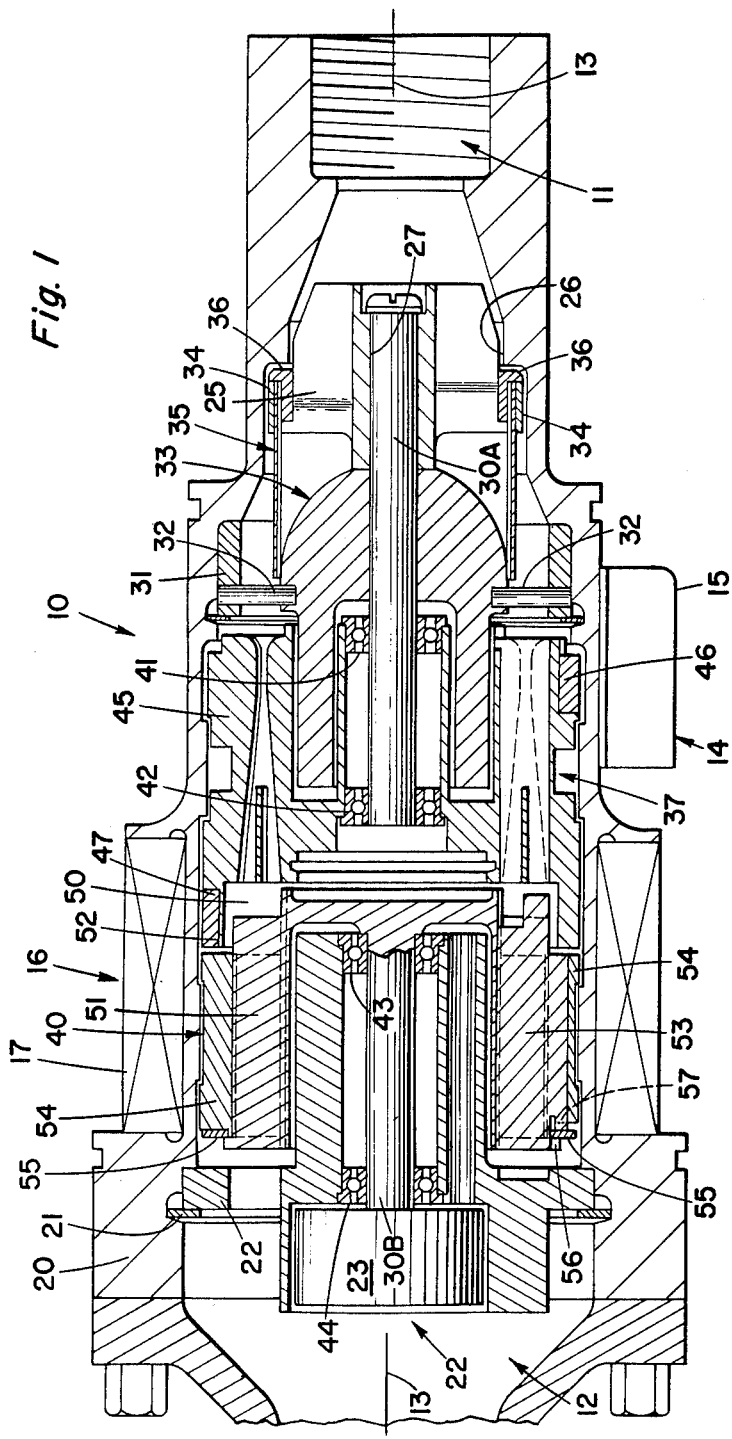
FIG. 1 is a longitudinal view, in cross-section, of a mass rate of flow meter embodying this invention.

FIG. 1 illustrates an exemplary flowmeter that incorporates this invention. It comprises a housing 10 having an inlet port 11 and an outlet port 12 at the ends of the housing 10 which, with other elements of the flowmeter, defines a generally annular passage for a fluid, such as aircraft fuel. The passage is generally disposed along a longitudinal axis 13. A first sensing coil assembly 14 generates first timing, or start, pulses and is affixed to the housing 10. The assembly 14 has a longitudinal axis that is perpendicular to the axis 13 and is secured in a shield 15.

A second sensing coil assembly 16 generates second, or stop, timing pulses and is also affixed to the housing 10. The assembly 16 has a longitudinal axis that is coincident with the axis 13 and includes a sensing coil 17 that is disposed at a flange 20 at the outlet port 12. Conductors from both the first sensing coil assembly 14 and the second sensing coil assembly 16 terminate at a connector assembly (not shown). Both the coil assemblies 14 and 16 are isolated from the flow of a fluid through the housing 10.

A first, or turbine, inner assembly is radially positioned on the housing 10 by a cohesing end flange 20 and an end assembly 22 and is axially positioned by a retaining ring 21 that connects with an end assembly 22 that also supports a spring mechanism 23. At the inlet port 11, a second, or rotor, inner assembly includes a flow straightener 24, that comprises a plurality of longitudinally extending, circumferentially spaced vanes 25. The flow straightener 24 is positioned in a tapered box 26 and is mounted to one end of a shaft 30A. An aligned shaft 30B is supported by the end assembly 22 and lies on the longitudinal axis 13.

A forward strut element in the rotor assembly comprises a stationary annulus 31 and a plurality of struts 32 that extend inwardly from the annulus 31 and that support a swirl generator 33. The annulus 31 radially positions the rotor assembly and connects with a retaining ring 31A to axially position the rotor assembly on the housing. The second generator 33 supports the shaft 30A. A flanged ring 34 is carried on the outer surface of the vanes 25 and supports one end of a variable diameter conduit 35 that provides a plurality of spring fingers encircling the swirl generator 33 and that acts as a flow reponsive valve as described later. A second ring 36 clamps the conduit 35 and the ring 34 to the vanes 25. This ring 36 also connects with the housing 10 to radially position the shaft 30A.

A rotor 37 and a turbine 40 are journaled on shafts 30A and 30B respectively in an axially spaced relationship. Thrust bearings 41 and 42 support and position the rotor 37 on the shaft 30A; thrust bearings 43 and 44, the turbine 40 on the shaft 30B. A flat band, helical spring (not shown) in the spring mechanism is clamped between the turbine 40 and the shaft 30B to restrain rotation of the turbine 40 about the shaft 30B.

An outer annulus 45 on the rotor 37 supports a group of permanent bar magnets 46 in the periphery of the rotor 37. These magnets are disposed to produce a north-south magnetic axis along a chord near the periphery of the rotor 37. Each time the magnets 46 rotate past the sensing coil assembly 14, a start pulse is induced in the coil assembly 14 that indicates the passage of a predetermined point on the rotor 37 (i.e., the location of the magnets 46) past a predetermined point on the housing 10 (i.e., the location of the coil assembly 14).

Another group of permanent magnets 47 also mounts to the outer annulus 45 of the rotor 37. More specifically, the annulus 45 has an annular extension 50 that extends toward and overlaps a portion of the turbine, specifically the ends of turbine blades 51 on the turbine. Longitudinal grooves 52 are cut in the outer surface of the extension 50 to carry longitudinal extending, closely spaced, radially poled magnets 47. These magnets 47 also produce a field with a north-south magnetic axis lying along a chord near the periphery of the rotor 37.

In addition to the turbine blades 51, the turbine 40 carries an exciter blade 53 of a permeable material and a diametrically opposed, non-permeable, balancing blade (not shown). An outer ring band, or shroud, 54 fits over the turbine blade 51, the exciter blade 53, and the balancing blade. The band 54 engages a flat collecting ring 55 of a permeable material between the band 54 and a radial extension 56 on the turbine 40. The ring 55 bears against a tab 57 from the exciter blade 53 and a similar tab from the balancing blade.

Each time the magnets 47 pass the exciter blade 53, flux linkages are coupled to the coil 17 through the exciter blade 53 and the flux collection ring 55 and induce an electrical step pulse in the sensing coil 17 that indicates the passage of another predetermined point on the rotor 37 (i.e., the location of the magnet 47) past a predetermined point on the turbine (i.e., the position of the exciter blade 53). The time between the start and stop pulses is representative of flow rate.

As shown in FIG. 1, the sensing coil assembly 16 has a significant axial length and surrounds the housing 10. The sensing coil 17 is therefore very susceptible to electromagnetic interference. However, FIG. 2 discloses a cross-section taken through the upper portion of the sensing coil assembly 16 and the housing 10 that is constructed to reduce the effects of electromagnetic interference to acceptable levels.

Figure 2:
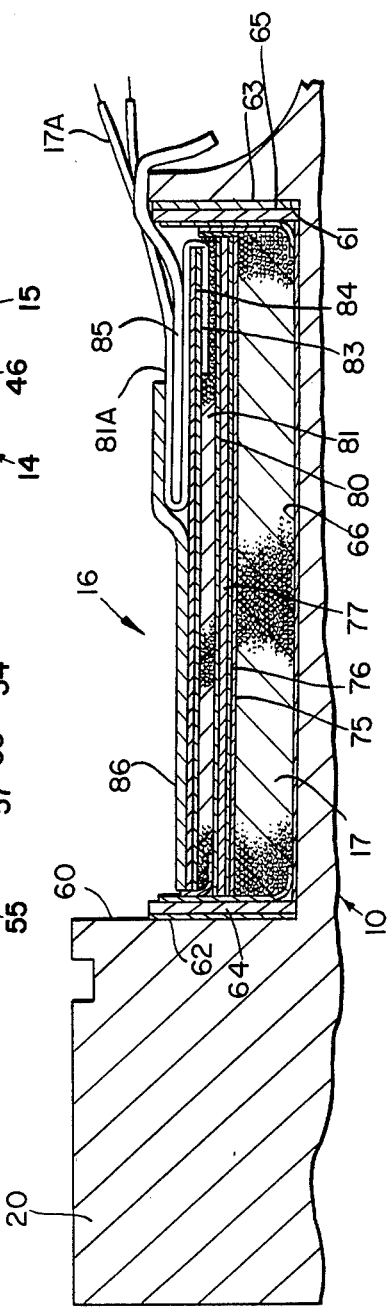
FIG. 2 is an enlarged partial view, in cross-section, of a portion of the mass rate of flow meter shown in FIG. 1 that illustrates this invention.

The sensing coil assembly 16 is positioned on the housing 10, as shown in FIG. 1, to be axially coextensive with at least a portion of the turbine 40. As shown in FIG. 2, the housing 10 has formed therein an end wall 60 formed in the flange 20 shown in FIG. 1, and an end wall 61 that is spaced from the end wall 60 toward the input port 11. As shown in FIG. 2, the end walls 60 and 61 are positioned respectively at the left and right ends of the sensing coil assembly 16. These end walls and the cylindrical surface of the housing 10 that extends between them provide a mechanical support for the sensing coil 17 in both radial and axial directions.

Still referring to FIG. 2, the sensing coil assembly 16 includes magnetic shields 62 and 63 affixed to the end walls 60 and 61 respectively. Annular insulating pieces 64 and 65 are positioned against the magnetic shields 62 and 63 thereby to provide, with the shields 62 and 63, an insulated, magnetic shield. Insulation 66 also is disposed on the periphery of the housing 10 between the annular insulating members 64 and 65 so there is provided an insulated core for the sensing coil 17.

The sensing coil 17 is wound on this insulated core. Additional insulation 75 is wrapped about the sensing coil 17 and a magnetic shield 76 is placed over the insulation 75. The magnetic shields 62 and 63 on the end walls 60 and 61 and the magnetic shield 76 thereby provide a magnetically shielded, electrically isolated sensing coil 17 that is in the magnetic circuit with the exciter blade 53 but that is isolated magnetically from any elements that lie radially outside the magnetic shield 76.

A sheet of copper wraps about the magnetic shield 76 to form a shorted turn 77. In one example, the sheet that extends between the insulated end walls 60 and 61; an axially extending seam is soldered. As described later, this shorted turn 77 serves as a phase correcting means.

A layer 80 of insulating tape is wrapped about the shorted turn 77, and a bucking coil 81 is formed on this layer 80. The number of turns is less than the number of turns in the sensing coil 17. Specifically, the coil is wound proportionally to provide an offsetting voltage in response to electromagnetic interference that is equal to and opposite the voltage induced in the sensing coil 17. In one particular embodiment the ratio of the turns in the sensing coil 17 to the turns on the bucking coil 81 is about 55:9.

Corresponding leads connect the sensing coil 17 and the bucking coil 81 in electrical series. Insulation 83 over the entire axial length of the bucking coil 81 also secures the remaining leads 17A and 81A from the sensing and bucking coils. Another magnetic shield 84 is placed about the insulation 83. The leads 17A and 81A pass from the interior portions of the coil assembly 16 and are directed back axially along the magnetic shield 84 toward the end wall 60. A piece of shrink tubing 85 over a portion of the entire assembly adjacent to the end wall 61 and the end wall 61 itself positions and supports the leads 17A and 81A. The leads 17A and 81A are directed back toward the end wall 61. A second piece of shrink tubing 86 extends axially from the end wall 60 toward the end wall 61 until it overlaps the tubing 85 and secures the leads 17A and 81A.

As previously indicated, the number of turns in the sensing coil 17 and the bucking coil 81 are selected to provide a minimum response to electromagnetic interference. Currents that are induced in the shorted turn 77 by electromagnetic interference act with the currents that are induced in the housing 10 to shift the phase of the signals induced in the bucking coil 81. The resulting relative phase shift between the signals induced in the sensing coil 17 and the bucking coil 81 provides significantly better compensation with the shorted turn 77. The shielding about the sensing coil 17 minimizes any magnetic flux that is coupled to the bucking coil 81. As a result, any flux that does reach the bucking coil has only a minimal effect and does not adversely affect the signal level that the sensing coil 17 generates.

A test of the sensitivity of a flowmeter to electromagnetic interference requires a conductor to be wound tightly around the flowmeter and then to be energized with a 20 ampere, 400 Hz current. During one test it was found that the voltage at one measurement point in a circuit that was produced by the voltage induced in the sensing coil 17 had a peak voltage of 16 millivolts. This was well within the acceptable limit of 60 millivolts peak for that measurement point and significantly below the 700 millivolt peak interference voltages that were detected when a similar flowmeter of a prior design was tested. During another test, the voltage across the leads 17A and 81A was found to be at a peak value of 13 millivolts which is well within the allowable limits of 20 millivolts at that position.

In summary, there is provided a sensing coil assembly for a mass rate of flow meter of the restrained turbine type that is relatively insensitive to adverse effects of electromagnetic interference in a wide variety of applications. The embodiment shown in FIG. 2 depicts a particular configuration of elements and sets forth specific values and materials. It will be apparent, however, that this description is for purposes of explanation only and that various modifications to the specifically described embodiment can be made while still achieving some or all of the benefits of this invention. Therefore, it is an object of the appended claims to cover all such variations and modifications as come within the true spirit and scope of this invention.

What is claimed as new and desired to be secured by Letters Patent of the United States is:

1. In a mass rate of flow meter including a housing means for defining a passage for a fluid, swirl generator means, unrestrained rotor means and restrained turbine means axially displaced along a longitudinal axis through the housing means, first sensing means for detecting the passage of a predetermined point on the rotor means past a predetermined point on the housing means, and a second sensing means including magnet means on the rotor means and turbine means for detecting the passage of another predetermined point on the rotor means past a predetermined point on the turbine means, the improvement of sensing coil means for the second sensing means that is characterized by reduced sensitivity to electromagnetic interference, said sensing means comprising:

A. sensing coil means mounted to the housing means in a coaxial, axially coextensive relationship with at least a portion of the turbine means, B. bucking coil means mounted coaxially with said sensing coil means and electrically connected with said sensing coil means, and C. phase correcting means disposed between said sensing coil means and said bucking coil means and including a shorted turn of nonmagnetic, electrically conductive material for shifting the selective phase of signals produced in said sensing coil means and said bucking coil means in response to electromagnetic interference.

2. A mass rate of flow meter as recited in claim 1 wherein said bucking coil means is connected electrically in series with said sensing coil means.

3. A mass rate of flow meter as recited in claim 2 wherein said sensing coil means includes magnetic shield means for magnetically isolating said sensing coil means from said bucking coil means.

4. A mass rate of flow meter as recited in claim 3 wherein said bucking coil means is disposed radially outside said sensing coil means, and said magnetic shield means includes magnetic shield material about the outer periphery of said sensing coil means and radially extending from the ends of said sensing coil means.

5. A mass rate of flow meter as recited in claim 4 wherein the ratio of turns in said sensing coil means to the turns in said bucking coil means is greater than one.

6. A mass rate of flow meter as recited in claim 5 wherein said phase correcting means includes a copper sheet.

7. A mass rate of flow meter as recited in claim 6 wherein said copper sheet is insulated from said sensing coil means and said bucking coil means.

8. A process for minimizing the effects of external electromagnetic interference on a mass rate of flow meter including a housing means for defining a passage for a fluid, swirl generator means, unrestrained rotor means and restrained turbine means axially displaced along a longitudinal axis through the housing means, first sensing means for detecting the passage of a predetermined point on the rotor means past a predetermined point on the housing means, and a second sensing means including magnet means on the rotor means, said process including the steps of:

A. generating a first signal in a sensing coil means mounted to the housing means in a coaxial, axially coextensive relationship with at least portion of the turbine means each time the magnet means on the rotor means passes a predetermined point on the turbine means, B. generating, in the sensing coil means and a bucking coil means mounted coaxially with said sensing coil means and electrically connected to said sensing coil means, counteracting interference voltages in response to electromagnetic interference, and C. shifting the relative phase of the interference voltages thereby to minimize the total interference voltage from the sensing coil means and the bucking coil means.

9. A process for minimizing the effects of external electromagnetic interference on a mass rate of flow meter as recited in claim 8 wherein said step of generating the interference voltages includes generating the interference voltage in the sensing coil means and bucking coil means in series.

10. A process for minimizing the effects of external electromagnetic interference on a mass rate of flow meter as recited in claim 9 wherein said phase shifting step comprises inducing an electric current in a shorted turn disposed between the sensing coil means and the bucking coil means.

11. A process for minimizing the effects of external electromagnetic interference on a mass rate of flow meter as recited in claim 9 wherein said step of generating the first signal includes magnetically shielding the sensing coil means from the bucking coil means.

* * * * *